United States Patent
Cote et al.

(10) Patent No.: US 7,459,076 B2
(45) Date of Patent: Dec. 2, 2008

(54) FLOW-THROUGH AEROBIC GRANULATOR

(75) Inventors: Pierre Lucien Cote, Dundas (CA); Henry Behmann, Puslinch (CA)

(73) Assignee: Zenon Technology Partnership, Wilmington, DE (US)

( * ) Notice: Subject to any disclaimer, the term of this patent is extended or adjusted under 35 U.S.C. 154(b) by 0 days.

(21) Appl. No.: 11/642,544

(22) Filed: Dec. 21, 2006

(65) Prior Publication Data

US 2007/0158265 A1 Jul. 12, 2007

Related U.S. Application Data

(60) Provisional application No. 60/752,404, filed on Dec. 22, 2005.

(51) Int. Cl.
   *B01D 24/00* (2006.01)
(52) U.S. Cl. ...................................... 210/189
(58) Field of Classification Search .................. 210/189
   See application file for complete search history.

(56) References Cited

U.S. PATENT DOCUMENTS

| | | |
|---|---|---|
| 4,623,464 A | 11/1986 | Ying et al. |
| 5,599,451 A | 2/1997 | Guiot |
| 5,776,344 A | 7/1998 | McCarty et al. |
| 5,885,460 A | 3/1999 | Dague et al. |
| 5,985,150 A | 11/1999 | Versprille et al. |
| 6,024,876 A | 2/2000 | Pannier et al. |
| 6,306,302 B1 | 10/2001 | Maree et al. |
| 6,556,119 B1 | 4/2003 | Lell |
| 6,780,319 B1 | 8/2004 | Thieblin et al. |
| 6,793,822 B2 | 9/2004 | Tay et al. |
| 7,060,185 B2 | 6/2006 | Kim et al. |
| 2003/0038080 A1 | 2/2003 | Vriens et al. |
| 2004/0178132 A1* | 9/2004 | Nakhla et al. ............... 210/189 |
| 2004/0206700 A1 | 10/2004 | Kim et al. |
| 2006/0032815 A1 | 2/2006 | Van Loosdrecht et al. |

FOREIGN PATENT DOCUMENTS

| | | |
|---|---|---|
| JP | 5337492 | 12/1993 |
| WO | WO2004024638 | 3/2004 |

OTHER PUBLICATIONS

De Kreuk, MK et al., "Aerobic Granule Reactor Technology", Stowa Report, Jun. 2003, pp. 1-55.
Liu, Y et al, "State of the Art of Biogranulation Technology for Wastewater Treatment", Biotechnology Advances, 2004, pp. 533-563.
Williams, Jon Christopher, "Initial Investigations of Aerobic Granulation in an Annular Gap Bioreactor", Releigh, 2004, pp. 28-79 and 111-114.
Tranh, Bui Xuan, "Aerobic Granulation Coupled Membrane Bioreactor", Asian Institute of Technology, May 2005.

* cited by examiner

*Primary Examiner*—Chester T Barry

(57) ABSTRACT

A continuous flow reactor or method promotes aerobic granule formation. The reactor may comprise three or four zones that may comprise one or more of an aerobic zone, an alternately aerobic and anoxic zone or discrete aerobic and anoxic zones, and a settling zone. The reactor may have a single sludge removal flow. An anaerobic zone may be located at the bottom of a mass of settled granules. Feed may be introduced through the settled granules generally in a plug flow. An aerobic/anoxic zone may be structured or operated partially like a continuously stirred tank reactor (CSTR) but with aeration varying in space or time. Sludge granules may move intermittently from an aerobic zone to an aerobic/anoxic zone, for example by an air lift pump. A settling zone may have an upflow of >4 m/hr or >5 m/hr and wash off flocculated biomass.

12 Claims, 3 Drawing Sheets

Reactor configuration for Embodiment 2 (Rectangular tank)

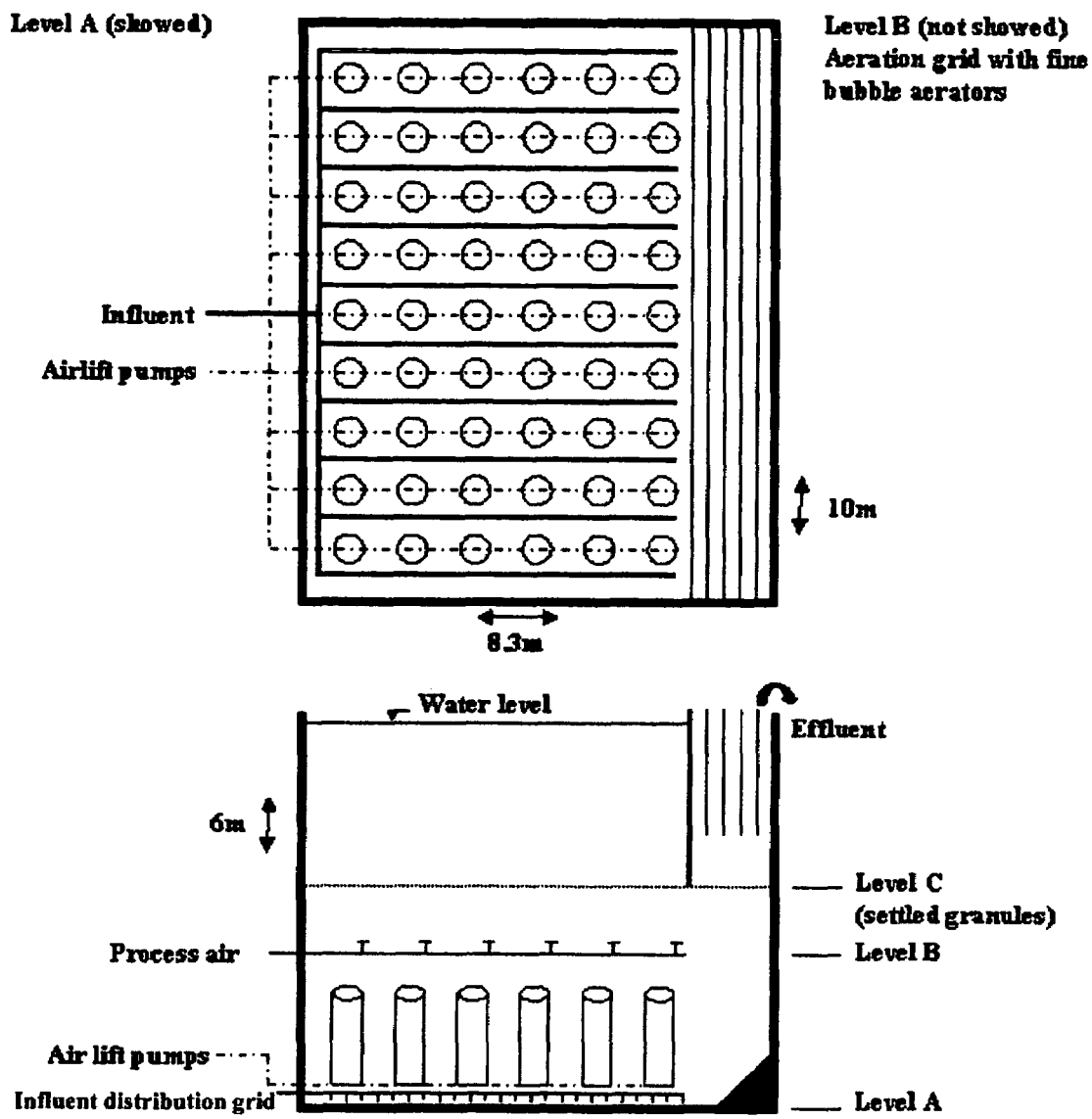
Figure 1. Reactor Configuration for Embodiment 1

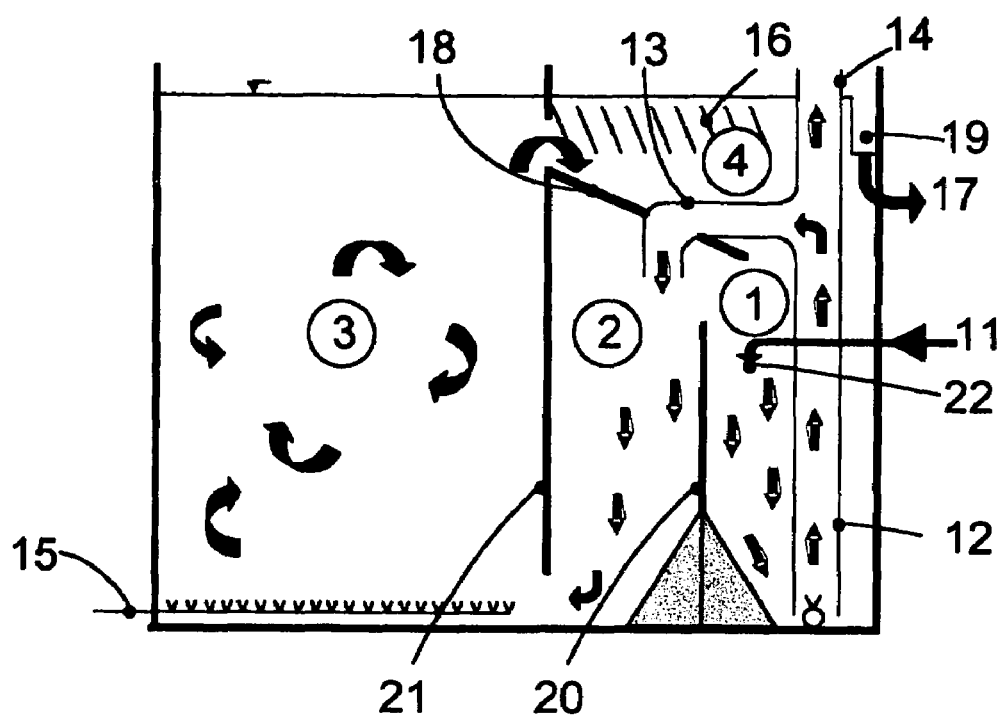
Figure 2. Reactor configuration for Embodiment 2 (Rectangular tank)

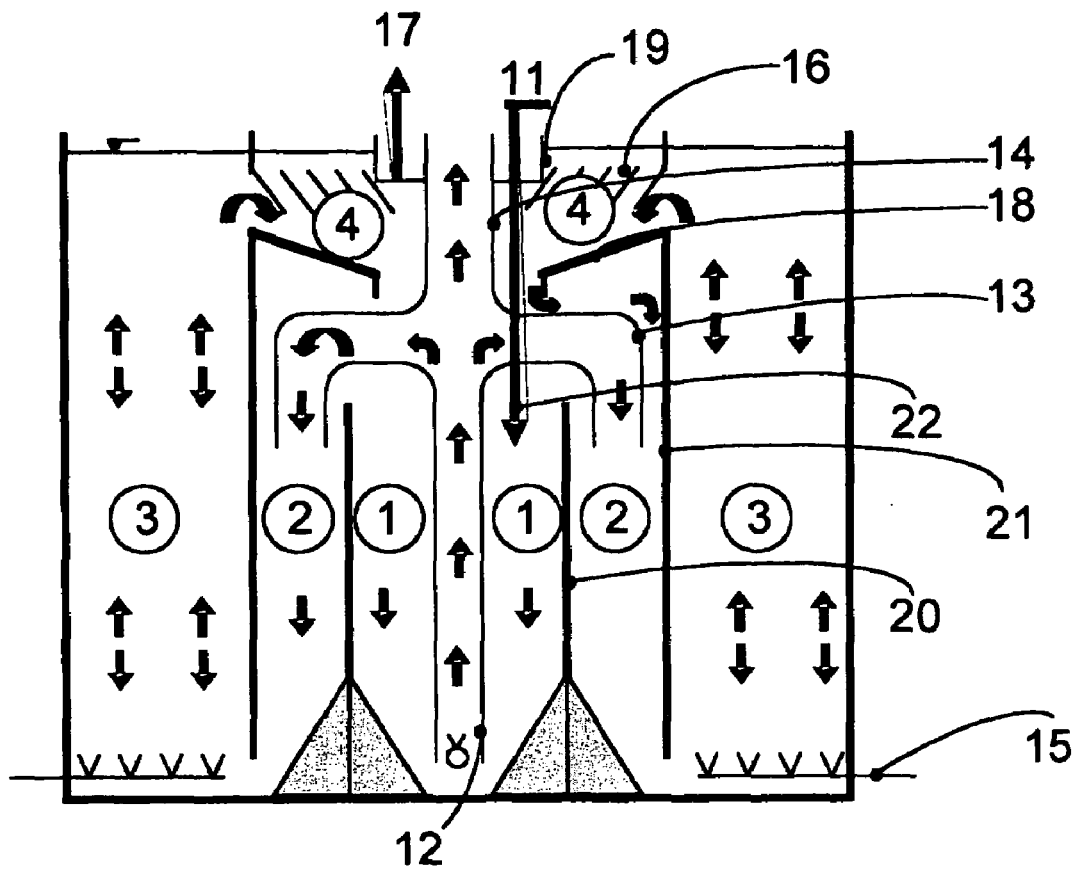
Figure 3. Reactor configuration for Embodiment 2 (Round tank)

FLOW-THROUGH AEROBIC GRANULATOR

This is an application claiming the benefit under 35 USC 119(e) of U.S. application Ser. No. 60/752,404 filed Dec. 22, 2005. U.S. application Ser. No. 60/752,404 is incorporated herein, in its entirety, by this reference to it.

FIELD

This specification relates to wastewater treatment.

BACKGROUND

The following discussion is not an admission that anything discussed below is citable as prior art or part of the knowledge of people skilled in the art. Any statements regarding the results, performance or inventiveness etc., relating to patents or publications discussed below, are the representations of the alleged inventors of those patents or publications and the present inventor does not admit that any such statements are true.

Granules are dense agglomerates of biomass. Compared to floc or activated sludge, the granules are denser, stronger and settle at a higher velocity. Individual granules may be roughly spherical with a diameter of 1-2 mm, a density of 60-90 g/L and a settling velocity of 30-40 m/hr. Granules may be aerobic or anaerobic as determined by the primary mode of digestion of microbes in the biomass. Anaerobic granules have been commercialized in upflow anaerobic sludge blanket (UASB) reactors.

U.S. Pat. No. 6,566,119 relates to a method of acquiring granular growth of a microorganism in a reactor containing a liquid medium. Surprisingly, according to the invention, aerobic microorganisms are induced to granular growth by maintaining specific culture conditions. During a first step an oxygen-containing gas is supplied and the reactor contents are kept in turbulence. In a second step, after a short settling period, the top part of the reactor medium is discharged.

U.S. Pat. No. 6,793,822 describes a method of producing aerobic biogranules for the treatment of waste water comprising the steps of: a) introducing waste water into a reactor; b) seeding the reactor with a active biomass material; c) supplying the oxygen-containing gas to the reactor to provide a mixing action to the suspension of biomass material in said waste water, the supply of oxygen-containing gas providing a superficial upflow gas velocity greater than 0.25 cm/s; d) initiating a period of nutrient starvation of the biomass material while continuing to supply oxygen-containing gas; e) allowing formed aerobic granules to settle in a settling zone in said reactor; f) discharging at least a portion of the waste water; g) repeating steps (a) to (f) until at least a portion of the biogranules in said settling zone are within a predetermined properties; and h) recovering said biomass granules within those predetermined properties.

International Publication No. WO 2004/024638 relates to a method for the treatment of wastewater comprising an organic nutrient. According to the invention, the waste water is in a first step fed to sludge granules, after the supply of the waste water to be treated the sludge granules are fluidised in the presence of an oxygen-comprising gas, and in a third step, the sludge granules are allowed to settle in a settling step. This makes it possible to effectively remove not only organic nutrients but optionally also nitrogen compounds and phosphate.

U.S. Pat. No. 6,780,319 describes a method of purifying wastewater charged with organic matter which comprises a step of biologically treating the water, during which the organic matter contained in the water is degraded by microorganisms thereby producing sludge, and a water-sludge separation step, the sludge coming from the separation step being recycled in the biological treatment step, this method being characterized in that it further comprises a step of degrading the sludge, coming either from the biological treatment step or from the separation step, during which the sludge is brought into contact with an ozonated gas under conditions making it possible to obtain a floc consisting of granules whose mean size is greater than 200 microns, the volatile matter content is between 50 and 65%, the thickening factor of this granular sludge, after 30 minutes of settling, always being greater than 4, the conditions for obtaining the said granular sludge consisting in: treating between 0.1 and 2 times the mass of sludge present in the biological treatment step per day and preferably between 0.7 and 1.5 and, applying an ozone dose of between 3 and 100 grams of ozone per kilogram of treated suspended matter (SM), preferably between 4 and 10 grams of ozone per kilo of treated SM.

U.S. Pat. No. 5,985,150 is directed to a process for the aerobic purification of wastewater in a reactor containing unsupported granular active sludge. The oxygen necessary for maintaining aerobic conditions within the reactor is provided in the form of an oxygen-containing gas. The oxygen-containing gas is preferably introduced into the reactor at such a place that the oxygen-containing gas provides at least some mixing action in the reactor. The invention also provides a reactor suitable for this process.

SUMMARY

The following summary is intended to introduce the reader to this specification but not to define any invention. One or more inventions may reside in a combination or sub-combination of apparatus elements or process steps described in this summary or in other parts of this document, for example the detailed description or the claims.

Various mechanisms promote growth of granules. The inventors believe that mechanisms that provide granule growth may include one or more of (a) the selection of species that tend to aggregate by periodically washing-off less dense floc; (b) cycling between periods of feasting and fasting; (c) selecting slow-growing organisms through a long anaerobic period; and, (d) applying a minimum level of shear at least from time to time. Attempting to provide these conditions, however, create various challenges. For example, some conditions may be provided by using a batch process. For large applications, such as municipal wastewater, matching the feed flow to flow through a batch reactor is difficult. For further example, washing off floc also washes off suspended solids. The washed off material cannot be returned to a reactor containing the granules or species selection will be compromised. Yet further, because granules have a low growth rate, granule wastage does not remove significant amounts of phosphorous.

This specification describes one or more apparatuses or processes that may address one or more of these issues or the desire to treat wastewater with aerobic granules. Granules can be grown in a sequencing batch reactor but this may require influent and effluent equalization. In contrast, this specification includes a description of a continuous flow reactor or method that promotes aerobic granule formation. One or more of the mechanisms that promote granule growth discussed above may be performed in a continuous flow through the reactor. The reactor may comprise three or four zones that may comprise one or more of an anaerobic zone, an alternately aerobic and anoxic zone or discrete aerobic and anoxic zones, and a settling zone. The reactor may have a single sludge removal flow. An anaerobic zone may be located at the bottom of a mass of settled granules. Feed may be introduced through the settled granules generally in a plug flow. An aerobic/anoxic zone may be structured or operated partially like a continuously stirred tank reactor (CSTR) but with aeration varying in space or time. Sludge granules may move intermittently from an aerobic zone to an aerobic/anoxic zone, for example by an air lift pump. A settling zone may have an upflow of >4 m/hr or >5 m/hr and wash off flocculated biomass.

BRIEF DESCRIPTION OF THE DRAWINGS

FIG. 1 shows a schematic plan and elevation view of a treatment system.

FIG. 2 shows a schematic elevation view of another treatment system.

FIG. 3 shows a schematic elevation view of another treatment system.

DETAILED DESCRIPTION

Various apparatuses or processes will be described below including an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. All rights are reserved in any invention disclosed in an apparatus or process that is not claimed in this document. Any one or more features of any one or more embodiments can be combined with any one or more features of any one or more other embodiments.

FIG. 1 shows a flow-through aerobic granulator (FTAG) designed to be implemented in a relatively shallow tank (for example where depth is less than either length or width). The sizes shown correspond to a 4,800 m$^3$/d plant with 2 FTAGs in parallel, each treating a flow rate of 100 m3/h in a volume of 500 m3 to provide a retention time of 5 hours. Each tank is 6 m deep, 10 m long and 8.3 m wide.

The feed is introduced at the bottom of the tank through an influent distribution grid.

Also at the bottom of the tank, there is an airlift pumping grid, optionally interlaced with the feed distribution grid. The airlift grid may comprise a series of coarse bubble aerators, each fitted with a section of pipe that extends from Level A (tank bottom) to near Level B (about ¼ of the tank depth; 1.5 m in the example given).

Also at Level B, there is a uniform grid of fine bubble process aerators.

Along the long side of the tank, there is a series of parallel plates that act as a plate settler. In the example shown, the plates occupy a surface area of 10 m$^2$ (10 m×1 m). The effluent rises through this section at a velocity of about 10 m/h (100 m$^3$/h/10 m$^2$). The settling zone is isolated from the reaction zone by a wall that extends down to about Level C to promote a vertical rising velocity within the settling zone.

The 3 grids described above do not extend across or below the settling zone.

The FTAG is designed to be operated with a high concentration of granules. The granules concentration may be determined by the interface level of settled granules (both sources of air off) which is controlled (by periodic wastage) to Level C (in the example given, Level C is about half of the tank depth or 3 m).

From a process point of view, the FTAG may comprise 3 zones:

i. An anaerobic zone below Level B
  ii. A mixed, or CSTR like, aerobic/anoxic zone above Level B
  iii. A narrow settling zone along one or two long sides.

At any point in time during operation of the FTAG, a fraction of the granules (for example between 25-50%) are settled below Level B and the complement is in suspension above Level B.

The influent introduced through the feed distribution grid rises in a generally plug flow mode through the settled granule bed between Levels A and B. The airlift pumps are off. The rise velocity may be about 1.2 m/h (100 m$^3$/h/83 m$^2$) for a maximum rise time of 1.5 hour.

Above Level B, aerobic/anoxic conditions prevail as the fine bubble aeration system is cycled on/off. The settling time in this region is 5-10 min (4 m/30 m/h) and the cycling period may be such that granules are regularly re-suspended. This can be done be cycling the air between the two FTAG in parallel at a cycling time smaller than the settling time. In this region, CSTR like conditions prevail but with varying dissolved oxygen concentration; COD is removed, nitrogen is reduce by nit/denit and PO4 is absorbed by PAO.

A flow equal to the feed flow continuously rises through the settler and overflow as treated effluent. The design velocity of the settler allows granules to return to the reactor, but flocculated biomass is entrained.

Periodically, the airlift pumps are turned on to transfer the granules sitting at the bottom of the tank into the aerobic/anoxic zone, above Level B. The displaced granules are replaced by granules from the aerobic/anoxic zone that settle to just below Level B. The frequency and duration of airlift pumping are controlled to provide sufficient granule retention time below Level B (where anaerobic conditions prevail so PAO can uptake VFA and release PO$_4$). For example, the airlift pumps may be activated for a few minutes every 30-60 minutes.

The flow-through aerobic granulator (FTAG) implements in a controllable way one or more of the 5 mechanisms of granule formation listed above:

i. Selection pressure is applied to keep granules in the reactor and wash-off light floc in the settling zone
  ii. Feasting takes place when the granules are exposed to undiluted feed below Level B. Fasting happens before the airlift pumps are activated and the levels of COD in the aerobic/anoxic section reaches a minimum (DO in the reactor should reach a maximum)
  iii. The long anaerobic period is provided below Level B.
  iv. High substrate concentration is provided below Level B; high DO concentration above Level B
  v. Shearing is provided during aeration, above Level B.

Another version of a FTAG is designed to be implementable in a broader range of tank configurations, rectangular or circular, shallow or deep and of varying sizes. This version contains 4 distinct zones: 1. Anaerobic, 2. Anoxic, 3. Aerobic, and 4. Settling and is shown, in two variations, in FIGS. 2 and 3.

The anaerobic zone (1) is a defined by a baffle which encloses a closed chamber open at the top. Incoming feed (11) and settling unit underflow is distributed to the top of this zone. Air lift pumps are situated at suitable intervals along the length of this zone (22). The airlift pumps (12) are situated such that their inlets are at the bottom of the anaerobic zone and their discharge (13) is at the top of the aerobic/anoxic zone (2). The sides of the bottom may be sloped to reduce dead zones and facilitate solids flow. In the case where the settler (4) is placed above the anaerobic zone, the air discharge from the air lift pumps is routed around the settler so not to affect its function.

The anoxic zone (2) is situated between the anaerobic zone (1) and the well mixed aerobic zone (3). It is open at the top and the bottom to induce downward circulation. This zone does not contain aeration elements. This zone provides a zone for the mixing of the anaerobic zone effluent (1) and the recirculating liquor from the aerobic zone (3). The zone provides an area of reduced dissolved oxygen content for continuous denitrification of the recirculating liquor from the aerobic zone. The passages between the aerobic and anoxic zones are sized to generate the required conditions for denitrification.

The aerobic zone (3) takes up the balance of the tank. It contains a uniform grid of fine bubble aerators (15) covering its bottom surface. This zone is uniformly mixed to effect complete dispersal of the granules and to maintain a high dissolved oxygen concentration.

The settling zone (4) may be situated on top of the anaerobic zone. This can be quite small if inclined plates (16) are used. It is sized to remove generally all solids with a settling velocity of less than 5 m/hr. The supernatant is discharged (17) and the settled granules are recycled to the anaerobic zone 1.

The individual zones are sized to provide the required anaerobic, anoxic/aerobic and settling functions. Flow between zones is also controlled to maintain the required reaction times.

FIGS. 2 and 3 illustrate reactors as described above in two examples of configurations. FIG. 2 shows an installation in a rectangular tank whereas FIG. 3 illustrates a circular tank implementation The basic system consists of 4 zones:
  i. Anaerobic plug flow zone
  ii. Anoxic plug flow zone
  iii. Aerobic completely mixed zone
  iv. Settling zone The feed (11) is introduced into the solids stream of the settling zone (22) for example directly under the setting unit (4). There it is mixed with the separated aerobic granules and introduced into an anaerobic zone (1). A specific level of settled solids is maintained in this zone, controlled by airlift pumps (12) which pump from the bottom of this zone to the top of the anoxic zone (2) through the airlift ejector parts (13). The airlift pumps are controlled to maintain the required anaerobic contact time in this zone.

The pumped liquor is mixed with a recirculating stream from the aerobic zone (3) and flows downward through the anoxic zone (2). The bottom of the anoxic zone (2) is open to the aerobic zone (3) and is sized to allow a circulation which generates the required anoxic denitrification times. The upper part of the anoxic zone (2) is open to the settling unit (4). Essentially no aeration takes place in the anoxic zone.

The mixture from the anoxic zone (2) is introduced through the bottom connection into the completely mixed aerobic zone (3). This zone contains over its bottom a fine bubble aeration grid to provide efficient oxygen transfer and complete dispersal of the granules.

The aerobic zone (3) is connected to the settling zone (4) which is usually situated over the anoxic (2) and the anaerobic zone (1). This settling zone is sized for retaining solids with a settling velocity greater than 5 m/hr and is consequently small in size. Effluent is discharged from the overflow of the settling zone. Inclined plate settlers (16) may be used for compactness. The solids (19) are directed by baffles (18) to the anaerobic zone (1). Excess granules fall into the anoxic zone (2).

Solids wasting is effected by intercepting and discharging a portion of the settler underflow before feed introduction or discharging directly from the aerobic zone.

This process is continuous in all operations except the air lift pumps which operate intermittently to maintain the required flow and level of granules in the anaerobic zone.

We claim:

1. A generally continuous flow wastewater treatment reactor comprising;
  a) an anaerobic zone containing granules;
  b) a zone with aeration alternating in time or space to produce aerobic and anoxic conditions or separate aerobic and anoxic zones, respectively;
  c) a settling zone; and
  d) a single sludge removal flow.

2. The reactor of claim 1 wherein the anaerobic zone is located at the bottom of a set of settled granules.

3. The reactor of claim 2 wherein feed enters through the set of settled granules.

4. The reactor of claim 1 wherein granules move intermittently from the anaerobic zone to the zone described at (b).

5. The reactor of claim 4 wherein granules move by way of air lift pump.

6. The reactor of claim 1 wherein, in the settling zone, granules are settled against an upflow of greater than 4 m/hr and unsettled biomass is removed.

7. generally continuous flow wastewater treatment reactor comprising;
  a) an anaerobic zone containing granules;
  b) a zone with aeration alternating in time or space to produce aerobic and anoxic conditions or separate aerobic and anoxic zones, respectively; and
  c) a settling zone;
  wherein the anaerobic zone is located at the bottom of a set of settled granules.

8. The reactor of claim 7 wherein feed enters through the set of settled granules.

9. The reactor of claim 7 wherein granules move intermittently from the anaerobic zone to the zone described at (b).

10. The reactor of claim 9 wherein granules move by way of air lift pump.

11. The reactor of claim 7 wherein, in the settling zone, granules are settled against an upflow of greater than 4 m/hr and unsettled biomass is removed.

12. The reactor of claim 7, having a single sludge removal flow.

* * * * *